Figure 1:
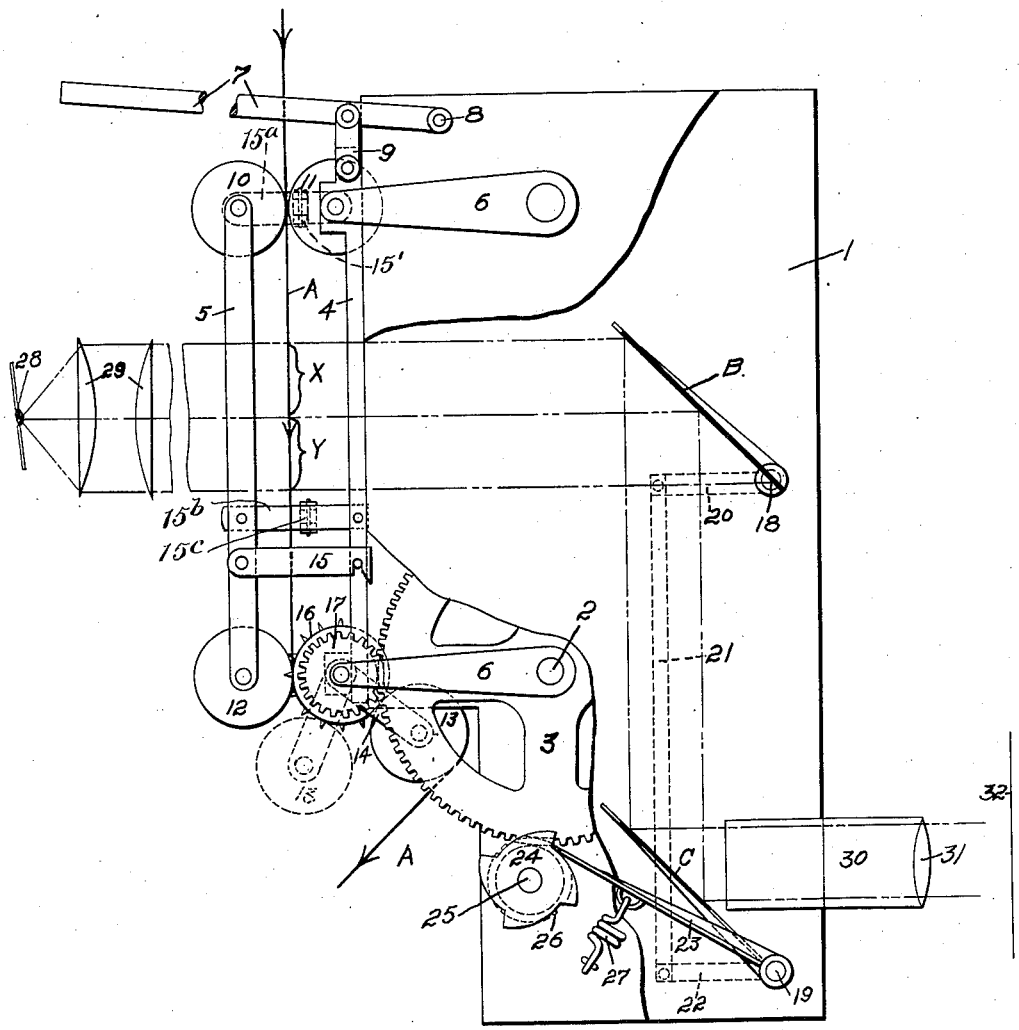

C. L. TOMLINSON.
MOVING PICTURE MACHINE.
APPLICATION FILED APR. 10, 1914. RENEWED JULY 27, 1915.

1,332,238.

Patented Mar. 2, 1920.
2 SHEETS—SHEET 2.

UNITED STATES PATENT OFFICE.

CLARENCE L. TOMLINSON, OF PORTLAND, OREGON.

MOVING-PICTURE MACHINE.

1,332,238. Specification of Letters Patent. Patented Mar. 2, 1920.

Application filed April 10, 1914, Serial No. 830,938. Renewed July 27, 1915. Serial No. 42,237.

*To all whom it may concern:*

Be it known that I, CLARENCE L. TOMLINSON, a citizen of the United States, residing in the city of Portland, county of Multnomah, and State of Oregon, have invented certain new and useful Improvements in Moving-Picture Machines, of which the following is a specification.

This invention relates to moving picture machines and more particularly to certain improvements therein whereby, with the use of mirrors or reflectors, a uniform and continuous movement can be given to the film, instead of the usual intermittent movement which is so destructive thereof.

Among the objects of the invention are to provide a mechanism wherein it is made possible to keep a constant amount of light flux on a picture screen at all times and thereby to eliminate the flicker, and also making it possible, if desired, to do away with a shutter; to provide a machine of the character referred to which is capable, not only of use as a projecting machine, but which can be used as a camera, and because of the continuous uniform movement of the film, the increased time of exposure, the elimination of the shutter, and the increase in the amount of light flux falling on the film, it has many advantages as a camera. These and other objects and advantages will be readily understood from the following description of one embodiment of the invention shown on the accompanying drawings for purposes of illustration.

An important feature of this invention comprises the use of two mirrors or reflectors movably mounted in preferably angular positions and facing each other, so that an image thrown into one of said mirrors along one path is by it thrown into the other, and from said other mirror said image can be thrown on to a screen along another path. I have discovered that the pictures on a moving film can be successfully projected thus into said mirrors, and on to a screen, by imparting to said mirrors simultaneous movements timed with the movement of the film, so that, although the film is moving, the simultaneous oscillation or adjustment of the mirrors operates to keep the image projected along the same path to the screen without any variation in the focus, the distance from the film to the projecting lens remaining at all times the same. This operation occurs as each picture on the film moves one step, or from one position to the next adjacent position. At the instant a picture reaches a position on one mirror or reflector so that it cannot be reflected by the second mirror or reflector along the same path to the screen, the mirrors or reflectors are mechanically returned to their initial positions for the next picture, already in place to be picked up by the second mirror or reflector. There is no noticeable varying of the light on the screen, and therefore no flicker, for the time required for the return of the mirrors to their initial positions and for the substitution of one image for another on the screen is not noticeable, thereby presenting at all times on the screen the appearance of a continuously moving picture free from flicker.

In the drawings here shown for purposes of illustration,—

Figure 2:
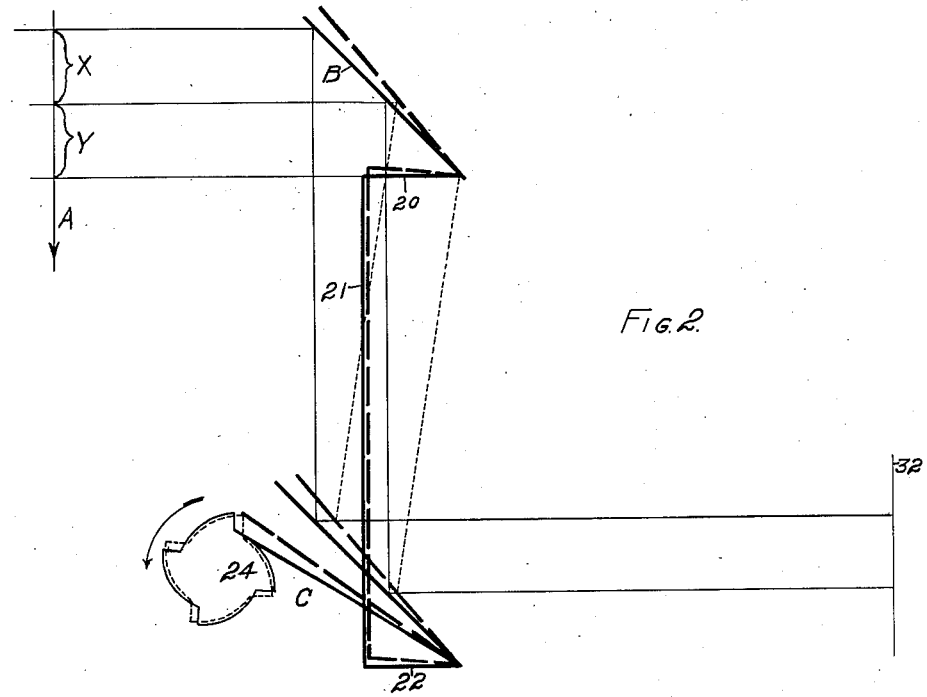

Figure 1 is a side elevation of so much of a moving picture machine as is necessary to show my improvements, with a portion of one side broken away to show the interior arrangement; and Fig. 2 is a diagrammatic view of the essential features of the invention.

In the drawings, 1 designates the box or housing, which may be of any suitable construction, with a main driving shaft 2 mounted therethrough, carrying a driving gear 3. This shaft 2 may also be provided with a driving pulley or crank, and at its opposite end, if desired, with a fly wheel, neither of which are here shown, but will be readily understood. A carrying frame consisting of the members 4 and 5 is adjustably mounted against the edge of the housing 1, supported by the arms, 6—6, and adapted to be moved vertically by means of a lever 7, pivoted to the housing, as at 8, and connected to said carrying frame by means of a link, as 9, for a purpose hereinafter again referred to. This carrier frame is provided with suitable guide and friction rollers, as 10, 11, 12 and 13, for guiding the film A, and for regulating the tension thereof. The guide roller 13 is mounted at the end of a short arm 14, pivotally supported at its opposite end and held under a friction joint, whereby said arm 14 and said roller 13, can be moved forwardly, as indicated in dotted lines, to facilitate the threading of the film into the machine. In order to simplify the threading operation, the member 5 may be hinged at one side to the member 4 so that the film can be easily placed between the rollers 10, 11 and the roller 12 and a sprocket 16. The hinges 15' may be included in the spacing members 15ᵃ and 15ᵇ shown in dotted lines in Fig. 1. A latch 15 is employed to hold the frame members 4 and 5 together.

The driving sprocket 16 is mounted in the lower end of said carrying frame for imparting motion to the film A, said sprocket being driven through a gear 17 meshing with the main driving gear 3.

Movably mounted within the housing 1, in angular positions and facing each other, are two mirrors or reflectors, B and C. In the present showing these mirrors are mounted upon shafts, as 18 and 19, mounted through the housing 1, and connected by means of links, as 20, 21 and 22, shown in dotted lines, at the opposite side of the housing, whereby said mirrors can be moved or oscillated simultaneously, for a purpose and in a manner now to be referred to.

As a means for moving or oscillating said mirrors, I have provided an arm 23, secured to the shaft 19, with its opposite end riding upon a cam member 24, mounted upon a shaft 25, through the housing 1, and driven by means of a gear 26, also meshing with the main gear 3, said gear 26 and cam member 24 being timed with the movement imparted to the film A. Said mirror operating arm 23 is normally held upon the cam member 24 by means of a spring 27, and by this said mirrors are returned to their normal or initial positions.

The source of light may be designated as 28, and the condensing lens as 29. The tube through which the light is thrown on to the screen is designated as 30, and the focusing lens therein as 31. The screen may be designated as 32 and is shown by a simple line without regard to distance.

The operation of the machine may be briefly described as follows: Assuming that the film A is in place, as indicated, and that the parts are in their initial positions as shown in full lines, the main driving gear is turned clockwise, driving the film sprocket 16 and also the cam member 24, by means of which the mirrors B and C are oscillated together. In threading the film into the machine and framing the picture, the carrier frame may be raised or lowered slightly by means of the lever 7 to move the film so as to bring the picture into the proper position relative to the mirrors, as to position X, when the mirrors are in their initial positions. As the film moves downwardly so that a picture thereon moves from position X to position Y, the mirrors B and C also move together in such manner that the picture thrown onto the mirror or reflector B and moving over said mirror or reflector, is reflected onto the mirror or reflector C so that the picture is at all times properly directed through said tube 30 to the screen 32 during said movement of the film from position X to position Y. At the instant the picture starts from position Y, the mirrors are instantly moved back to their initial positions so that the mirror or reflector C pick up the next picture which has moved into position X. As hereinbefore stated, the time required for this return movement of the mirrors to their initial positions and for the substitution of the next picture on the screen 32 is shorter than the time retentivity lag of the eye, which varies from one-sixty-fourth to one-one hundred twentieth of a second, while this return movement of the mirrors is accomplished in less time, thus presenting at all times the appearance of a continuously moving picture, free from flicker.

It will be seen, therefore, that the arrangement and movement of the two mirrors or reflectors B and C, relatively to the source of light, is such that the useful light rays of each picture or image of the film thrown onto the mirror or reflector B from the source of light, will not only travel on the mirror or reflector B, due to the travel of the film, but will be reflected by said mirror or reflector B at all useful points thereon to points on the mirror or reflector C. The useful light rays received at the useful points on the mirror or reflector C are reflected by the mirror or reflector C in a plane substantially parallel to the plane of the light rays from the light to the mirror or reflector B. The plane of the light rays reflected from the mirror or reflector C at the said points are always in the field of the lens 31. Thus in Fig. 2, assuming that the two lines connected by the bracket X designate the limits of the area or zone of useful light rays passing to the mirror or reflector B from a picture or image (and disregarding such light rays as may be diffused by the film body in all directions), the same area or zone of light rays when received at the useful points on the mirror or reflector C will be reflected from these points in a plane which is parallel to the plane of the area or zone of light rays passing to the mirror B. Therefore, while light rays from one or more of the succeeding pictures or images are thrown on the mirror or reflector B while the light rays from the first mentioned picture or image are traveling thereon, and are reflected by the mirror or reflector B, such reflection by the mirror or reflector B onto the mirror or reflector C, if at all, of the light rays from said other picture or pictures will be outside the useful reflecting points on the mirror or reflector C, and therefore will not be in the field of the lens 31. It will be understood that any of the well known devices may be employed, if desired or necessary, to cut out undesirable rays from the picture areas on the film other than the one which is being projected, and this device may be located adjacent the aperture plate.

A shutter can be used to shut off the light during the very brief interval between a movement of a picture or image from its position X to its position Y, but I do not consider it desirable or at all necessary when used as a projecting machine. However, because of the extreme sensitiveness of the photographic film to light, it will probably be necessary to employ a shutter when the machine is used as a camera, for which it is equally well adapted.

It will be noticed that the machine is extremely simple, with very few and very simple parts. It is to be noted also that the film is operated in a direct line and under constant tension.

I do not limit the invention to the construction here shown for purposes of illustration, except as I may be limited by a broad interpretation of the hereto appended claims.

I claim:

1. In a moving picture machine, in combination with a source of light, the lenses, and a film with means for moving said film continuously, of two mirrors pivotally mounted to face each other at an angle with relation to the path of light, and means for simultaneously oscillating said mirrors flatwise in opposite directions, the movements of the film and mirror being in synchronism, for the purpose referred to.

2. In a moving picture machine, in combination with the source of light, the lenses and the film, of means for continuously moving said film, two mirrors pivotally mounted to be oscillated flatwise in angular positions relative to the rays of light and facing each other, whereby to throw an image from one to the other, and means for simultaneously moving said mirrors flatwise faceward and backward with the movement of the film.

3. In a moving picture machine, in combination with the film and means for continuously moving the same, two mirrors movably mounted one above the other at an angle to the path of light on fixed axes at a space apart and facing each other, and means for simultaneously moving them faceward and backward in a vibrating manner, timed with the movement of the film, for the purpose described.

4. In a moving picture machine, in combination, a source of light, lenses, a film with means for moving the same continuously, two mirrors mounted upon fixed axes to face each other at an angle to the path of light and adapted to be oscillated simultaneously faceward and backward, and means for oscillating said mirrors timed with the movement of the film, substantially as described.

5. In a moving picture machine, in combination, a housing, a source of light, lenses, a film, means for continuously moving said film, means for adjusting said film, two mirrors mounted on fixed axes in said housing to face each other in angular positions to the path of light, and means for simultaneously oscillating said mirrors faceward and backward, said means being timed with the mechanism for driving said film, substantially as described.

6. In a machine of the character referred to, in combination, a source of light, lenses, a film with means for continuously moving the same, two mirrors movably mounted to be oscillated in angular positions with relation to the path of light, and facing each other at a distance apart, and means for oscillating said mirrors simultaneously and in synchronism with the movement of the film, with means for causing an accelerated movement of said mirrors in one direction to bring them to their initial position.

7. In a machine of the character referred to, in combination with a source of light, a film and means for moving the same, lenses, two mirrors mounted at an angle across the path of the rays of light to be oscillated simultaneously and in synchronism with the movement of the film and facing each other at a space apart, a cam member for oscillating said mirrors, and means for driving said cam member and the mechanism for moving said film, substantially as described.

8. In a moving picture machine, the combination of a source of light, a film, means for moving the film continuously past the light, a mirror pivoted at one edge receiving the light passing through the film, a second mirror also pivoted at one edge and facing the first mentioned mirror, and means for providing a synchronous movement of the two mirrors with the film.

9. In a moving picture machine, in combination; a source of light; a film; means for continuously moving the film; a reflecting surface located in the path of light cut by the film from said source and said reflecting surface being supported to be moved from one angular position to a different angular position but in the same path of light; a second reflecting surface opposite the first and mounted to assume different angular positions; a connection between the said two surfaces whereby they are moved together; and means for moving one of said reflecting surfaces relatively to the path of light whereby the rays of a picture traveling on one of the reflecting surfaces will be received at points on the second reflecting surface which always reflect the said light rays along the same path.

10. In a moving picture machine, in combination; a source of light; a film; means for continuously moving the film; a plane reflecting surface located in the path of light cut by the film from said source and said reflecting surface being supported to be moved from one angular position to a different angular position but in the same path of light; a second plane reflecting surface opposite the first and mounted to assume different angular positions; a connection between the said two surfaces whereby they are moved together; and means for moving one of said reflecting surfaces relatively to the path of light whereby the rays of a picture traveling on one of the reflecting surfaces will be received at points on the second reflecting surface which always reflect the said light rays along the same path.

11. In a moving picture machine, in combination; a source of light; a pivoted reflecting surface located in a path of light; a film carrying pictures and movable between the light and said reflecting surface whereby light rays of said pictures will be thrown onto and travel on said surface; means for moving the film continuously, a second pivoted reflecting surface opposite the first; and means for moving the two reflecting surfaces relatively to the light whereby the rays of a picture traveling on the one reflecting surface will be received at points on the second reflecting surface which always reflect the said light rays along the same path.

12. In a moving picture machine, in combination; a source of light; a reflecting surface supported to be oscillated and located in the path of light; a film carrying pictures and movable between the light and said reflecting surface whereby light rays of said pictures will be thrown onto and travel on said surface; means for moving the film continuously, a second reflecting surface opposite the first supported to be oscillated; and means for oscillating the two reflecting surfaces relatively to the light whereby the rays of a picture traveling on the one reflecting surface will be received at points on the second reflecting surface which always reflect the said light rays along the same path.

13. In a moving picture machine, in combination; a source of light; a reflecting surface located in a path of light; a support for said reflecting surface whereby it may assume different angular positions relatively to the path of light; a film carrying pictures and movable between the light and said reflecting surface whereby light rays therefrom will be thrown onto and travel on said surface; means for moving the film continuously; a second reflecting surface opposite the first; a support for said second surface whereby it may assume different angular positions; and means for moving the said reflecting surfaces relatively to the path of light whereby the rays of a picture traveling on one reflecting surface will be received at points on the other reflecting surface to always reflect them along the same path.

14. In a moving picture machine, in combination; a source of light; a film carrying pictures or images; means for moving the film continuously; a reflecting surface located in a path of light from said source through the film; a support for said surface so that it may be moved from one angular position to a different angular position; a second reflecting surface opposite the first and similarly supported; a connection between the two said surfaces so that they will have the same amount of angular movement; and means for producing periodic movements of one of said surfaces in the same direction as the movement of the film in synchronism therewith and returning it to its initial position.

15. In a moving picture machine, in combination, a body, a source of light; a film, means for moving the film continuously, means for guiding the film through the body, a cam wheel, two oppositely disposed reflector members facing each other located in the path of light and adapted to be simultaneously oscillated flatwise, and operating connections from said cam wheel for oscillating said reflector members in synchronism with the movement of the film in order to keep the image fixed on the screen.

16. In a moving picture machine, in combination, a source of light; a reflecting surface supported so as to be oscillated and located in the path of light; a film carrying pictures and movable between the light and said reflecting surface; means for moving the film continuously; a second reflecting surface opposite the first and supported so as to be oscillated; a connection between the two reflecting surfaces whereby they are moved together; and means comprising a cam for moving the first mentioned reflecting surface relatively to the source of light and in periodic synchronism with the movement of the film in order to keep the image fixed on the screen.

17. In a moving picture machine, in combination, a source of light; a reflecting surface supported to be oscillated located in the path of light; a film carrying pictures and movable between the light and said reflecting surface; means for moving the film continuously; a second reflecting surface opposite the first and also supported to be oscillated with the first reflecting surface; a cam wheel movable synchronously with the movement of the film; and means operated from said cam wheel for causing a movement of said reflecting surfaces relatively to the light and in synchronism with the movement of the film in order to keep the image fixed on the screen.

18. In an apparatus of the character described, the combination of light projecting means, means for continuously moving a film across the path of light, opposed plane-reflecting surfaces rotatable about parallel axes, such reflecting surfaces interposed in the path of light between the film and the projecting lens, means for oscillating said reflecting surfaces in relative synchronism with the movement of the film to keep the projected image stationary on the screen and means for quickly returning said reflecting surfaces to their initial position in time with the travel of the film.

Signed at Portland, Multnomah county, Oregon, this 4th day of April, 1914.

CLARENCE L. TOMLINSON.

In presence of—
R. B. FRENCH,
WARREN P. SMITH.